United States Patent
Zhang et al.

(10) Patent No.: US 12,252,636 B2
(45) Date of Patent: Mar. 18, 2025

(54) TWO-COMPONENT SOLVENT FREE POLYURETHANE LAMINATING ADHESIVE COMPOSITION

(71) Applicant: Henkel AG & Co. KGaA, Duesseldorf (DE)

(72) Inventors: Nan Zhang, Shanghai (CN); Jingjing Liang, Shanghai (CN); Guan Yew Low, Shanghai (CN); Grant Kenion, Easton, PA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 594 days.

(21) Appl. No.: 17/451,331

(22) Filed: Oct. 19, 2021

(65) Prior Publication Data

US 2022/0162485 A1    May 26, 2022

Related U.S. Application Data

(63) Continuation of application No. PCT/CN2019/084037, filed on Apr. 24, 2019.

(51) Int. Cl.
| | | |
|---|---|---|
| *C09J 175/04* | (2006.01) | |
| *C08G 18/42* | (2006.01) | |
| *C08G 18/48* | (2006.01) | |
| *C08G 18/73* | (2006.01) | |
| *C09J 5/00* | (2006.01) | |

(52) U.S. Cl.
CPC ............ *C09J 175/04* (2013.01); *C08G 18/42* (2013.01); *C08G 18/4825* (2013.01); *C08G 18/4833* (2013.01); *C08G 18/73* (2013.01); *C09J 5/00* (2013.01); *C09J 2475/00* (2013.01)

(58) Field of Classification Search
CPC ........ C09J 175/04; C09J 5/00; C09J 2475/00; C09J 175/06; C09J 175/08; C08G 18/42; C08G 18/4825; C08G 18/4833; C08G 18/73; C08G 18/10; C08G 18/4255; C08G 18/7671; C08G 18/12; C08G 18/36
See application file for complete search history.

(56) References Cited

U.S. PATENT DOCUMENTS

| | | | |
|---|---|---|---|
| 4,623,709 A | 11/1986 | Bauriedel | |
| 5,998,538 A * | 12/1999 | Meckel | C08G 18/10 |
| | | | 528/80 |
| 8,933,163 B2 | 1/2015 | Krebs et al. | |
| 11,365,278 B2 | 6/2022 | Blodau et al. | |
| 2003/0045636 A1* | 3/2003 | Krebs | C08G 18/12 |
| | | | 525/131 |
| 2003/0144454 A1 | 7/2003 | Krebs et al. | |
| 2008/0071057 A1 | 3/2008 | Tsuge et al. | |
| 2011/0014479 A1* | 1/2011 | Song | C08G 18/4216 |
| | | | 156/305 |
| 2011/0218275 A1 | 9/2011 | Wu et al. | |
| 2017/0369632 A1 | 12/2017 | Pela et al. | |
| 2018/0044462 A1 | 2/2018 | Blodau et al. | |

FOREIGN PATENT DOCUMENTS

| | | | |
|---|---|---|---|
| CN | 101544880 A | | 9/2009 |
| CN | 102174308 | * | 9/2011 |
| CN | 103124756 A | | 5/2013 |
| CN | 106085333 A | | 11/2016 |
| CN | 106520054 A | | 3/2017 |
| CN | 107406574 A | | 11/2017 |
| CN | 107459959 | * | 12/2017 |
| CN | 107459959 A | | 12/2017 |
| CN | 107709398 A | | 2/2018 |
| CN | 107779162 A | | 3/2018 |
| EP | 0150444 A2 | | 8/1985 |
| EP | 1518874 A1 | | 3/2005 |
| EP | 3327056 A1 | | 5/2018 |
| JP | S6198733 A | | 5/1986 |
| JP | H0216181 A | | 1/1990 |
| JP | H06184517 A | | 7/1994 |
| JP | 2003096428 A | | 4/2003 |
| JP | 2011219698 A | | 11/2011 |
| WO | 2006123586 A1 | | 11/2006 |

OTHER PUBLICATIONS

Translation of CN107459959 (Year: 2017).*
Translation of CN 102174308 (Year: 2011).*
International Search Report for International PCT Patent Application No. PCT/CN2019/084037 dated Feb. 28, 2020.

* cited by examiner

*Primary Examiner* — Robert C Boyle
(74) *Attorney, Agent, or Firm* — Sun Hee Lehmann (57) ABSTRACT

The present invention provides a two-component solvent free polyurethane adhesive composition, comprising: (A) a OH-containing component, and (B) an NCO-containing component; wherein the mass ratio between the OH-containing component (A) and the NCO-containing component (B) is greater than 1:1, and the molar ratio between the OH group in the component (A) and the NCO group in the component (B) is less than 1:1.

19 Claims, 2 Drawing Sheets

TWO-COMPONENT SOLVENT FREE POLYURETHANE LAMINATING ADHESIVE COMPOSITION

TECHNICAL FIELD

The present invention relates to a two-component solvent free polyurethane laminating adhesive composition, comprising: (A) an OH-containing component, and (B) a NCO-containing component; wherein the mass ratio between the OH-containing component (A) and the NCO-containing component (B) is greater than 1:1, and the molar ratio between the OH group in the component (A) and the NCO group in the component (B) is less than 1:1.

BACKGROUND OF THE INVENTION

Flexible packaging, e.g. flexible pouches, has been widely used for product packaging application. Flexible packaging is typically prepared from laminated materials by laminating multiple flexible films, including for example plastic films and aluminum foils, to provide desired functions of final flexible packaging. For example, a flexible packaging material can be a lamination of three layers, wherein the inner layer directly contacts with packaged product and functions as a sealing layer. Polypropylene and polyethylene are best choices for this purpose. The middle layer typically functions as barrier layer, requires high barrier to moisture, gas, light, or aroma. Aluminum foils, metalized plastic films, or nylon have the desired barrier properties, thus could be used as the middle layer as barrier layer. The outer layer usually needs to have strong mechanical properties and also provides a surface for the printed information. Polyester films are the best choice for this purpose because of their excellent printability, high mechanical performance and transparency.

In order to bond different layers together to form a lamination material, the adhesive is applied between adjacent layers. These adhesives mostly are in liquid form, and they could either be a solution or dispersion in suitable solvent or be solvent free. Solvent-based adhesives such as water-based adhesives are applied to the surface of a layer using gravure or smooth rollers coating cylinders and dried when run through an oven. Solvent free adhesives need special machinery which has heated coating cylinders to maintain the adhesive in a low viscosity stage. Different layers are bonded together to form the laminated materials and accumulated in rolls. These rolls are kept in specific storage condition, to allow the adhesive to fully cure before use in some applications.

Although many types of polymer materials have been developed as laminating adhesives, polyurethane-based laminating adhesives still are the most preferred adhesive systems for flexible packaging material industry, because of their excellent adhesion strength, heat resistance, flexible under low temperature and chemical resistance. Among different types of polyurethane laminating adhesives, solvent free or solvent-less laminating adhesives, which can be applied at almost 100% solid contents, are becoming more popular in flexible packaging industry. Since solvent free adhesives are applied as 100% solid, this means no organic solvent emission and no drying process is needed, thus it is not only more environmentally friendly, less energy consumption, but also can run at very fast speed. Typical running speed for solvent-based adhesives such as water-based adhesives is limited to 100 to 200 m/minute depending on drying capability, in contrast, solvent free adhesives can be applied at more than 200 to 400 m/minute.

However, 100% solid content for solvent free adhesives also are more viscous compared with solvent-based such as water-based adhesives. Since solvent free adhesives are applied at very high speed, high viscosity will result in incomplete transfer from the coating roller onto the substrate surface, create adhesive mists, and generate bubbles, thus high viscosity at application temperature is not preferred for solvent free lamination adhesives. In order to achieve low viscosity at low application temperature, e.g. 40° C. to 60° C., solvent free adhesives need to be designed as a two-component system. The base component, also called isocyanate component or NCO-containing component, contains low molecular weight polyurethane prepolymers that have low viscosity; and the second hardener component, also called as hydroxyl component or OH-containing component, is mixed with the isocyanate component right before application.

After the isocyanate component and the hydroxyl component are mixed first and applied onto the application station, reaction between hydroxyl groups and isocyanate groups starts, creating high molecular weight polyurethane polymer, and viscosity starts to increase.

One concern of two component systems is the pot-life, which is defined as the time required for the mixed adhesive composition to double its as mixed viscosity. Typical 2-component adhesives have pot-life of 15-20 minutes. In case of an unpredicted interruption of the manufacturing process, if the viscosity of mixed adhesive composition increases too fast, the composition needs to be discarded and the machine needs to be thoroughly cleaned. Thus, a long pot-life is desirable for solvent free adhesives.

In order to achieve an acceptable application viscosity at low application temperature (typically 300-3000 mPa·s @ 40° C.), the isocyanate component usually needs to have very low molecular weight and high content of diisocyanate monomers, with free isocyanate group weight percentage (NCO %) in 10% to 25%. Hydroxyl component also needs to be low molecular weight prepolymers, has a hydroxyl value (OHV) of 150 to 400 mgKOH/g. In conventional two-component solvent free polyurethane laminating adhesive design, molar ratio of free NCO group to free OH group is greater than 1:1, typically set in between 1.2:1 to 2:1, and mass ratio of the hydroxyl component versus the isocyanate component is varied from 30:100 to 125:100. Total mass content of diisocyanate components, including TDI, MDI, IPDI, HDI, HMDI, XDI, NDI etc., is 30% to 50% in the adhesive mixture.

Another concern is that high level of free diisocyanate monomers residue and high level of free NCO group contents would lead to slower curing speed, because reaction speed between free NCO groups and hydroxyl groups is relatively slow at typical curing temperature (room temperature to 40° C.), the adhesive needs 24 hours to 72 hours to be fully cured even in 40° C. oven. Only after the adhesive is fully cured, the laminates can be further processed to make packages. So faster curing speed is desirable for solvent free lamination adhesives.

Another concern resulted from high diisocyanate content is government regulations for food safety. Food safety regulations require that the food packaging should be safe when in contact with packaged food. Unreacted free aromatic diisocyanate monomers, including TDI, MDI and NDI etc., can react with moisture and be hydrolyzed to corresponding primary aromatic amines (PAA), which were classified as a class of strong CMR chemicals. PAA molecules will migrate from packaging material to the packed food, and cause survivor food safety consequences. So, for food safety concern, PAA molecules need to be fully reacted with NCO groups of prepolymers to reach an undetectable migration level (e.g., <2 ppb). This process is the so called PAA decay.

High level of free diisocyanate monomers also can cause another problem called anti-sealing effect. An anti-sealing effect can generate if a substantial amount of monomeric isocyanate migrates to the outer surface of the sealing layer and reacts with water or slipping agents such as *eruca* acid amide or oleo acid amides from sealing films, e.g. LDPE film. This will result in formation of urea by reaction of these amides with monomeric isocyanates, especially aromatic isocyanates. The resulted urea typically has very high melting points (>200° C.) and can migrate to the surface of sealing film. When resulted urea forms a notable layer on the surface of sealing film, the sealing film may not be sealable anymore.

Some strategies have been disclosed to address above-mentioned problems. One strategy used in laminating adhesives to reduce monomeric diisocyanate content is using low monomer content prepolymers as the key ingredient. These prepolymers can be achieved by stripping monomers from prepolymers, as described in EP 1 518 874. However, this approach is very challenging, time consuming and requires special instruments, also typically leads to very high viscosity. Another strategy used in solvent free polyurethane lamination adhesives to reduce monomer content is utilizing different reactivity of isocyanate groups in unsymmetrical diisocyanate, e.g., 2,4-TDI or 2'4'-MDI, to react with hydroxyl components in a molar ratio of smaller than 2:1 to fully react the residue monomeric diisocyanate. This approach is described in EP 0 150 444. But this approach is also result in high viscosity at lower operating temperature. In order to achieve a reasonable operation viscosity, they require application at 70° C. or higher, which is not desirable for manufacturing or cleaning the laminating machinery.

SUMMARY OF THE INVENTION

In order to overcome the above problems, the present invention provides a two-component solvent free polyurethane laminating adhesive composition, comprising or consisting essentially of:
(A) an OH-containing component, and
(B) a NCO-containing component;
wherein the mass ratio between the OH-containing component (A) and the NCO-containing component (B) is greater than 1:1, and the molar ratio between the OH group in the component (A) and the NCO group in the component (B) is less than 1:1.

Preferably, the OH-containing component (A) has a hydroxyl value in the range of 20-160 mgKOH/g, preferably 70-150 mgKOH/g. More preferably, the component (A) comprises or consists essentially of or consists of one or more polyether-ester polyols. Particularly, the one or more polyether-ester polyols each has a hydroxyl value in the range of 20-160 mgKOH/g, preferably 70-150 mgKOH/g.

Preferably, the NCO-containing component (B) has a NCO group content of 8 wt. % to 25 wt. %, preferably 10 wt. % to 20 wt. %, based on the component (B). More preferably, the component (B) comprises or consists essentially of or consists of one or more NCO-terminated polyurethane prepolymers. Particularly, the one or more NCO-terminated polyurethane prepolymers each has a NCO group content of 8 wt. % to 25 wt. %, preferably 10 wt. % to 20 wt. %, based on the component (B).

The strategy of the present invention is to reduce total mass equivalent of the isocyanate component in the adhesive composition by increasing the mass equivalent of the hydroxyl component while keeping the molar ratio of the hydroxyl group to the isocyanate group in a range of less than 1:1. By reducing the total mass amount of the isocyanate component, the total amount of the monomeric diisocyanate residue in the adhesive composition is reduced accordingly. In the present invention, the total content of isocyanate component in adhesive composition can be reduced by 20% to 55% by weight, and correspondingly, the monomeric diisocyanate residue can be reduced by 20% to 55% by weight, too.

By using such mixing strategy, the obtained adhesive composition will contain less isocyanate component compared with conventional adhesive compositions. It is known that the bonding strength largely comes from urethane component in cured polyurethane polymer, and normally, less isocyanate component would result in less urethane component and thus less bonding strength. However, the inventors surprisingly found that the bonding strength of the obtained adhesive composition of the present invention remains the same level as conventional polyurethane lamination adhesives.

Therefore, the polyurethane laminating adhesive composition of the present invention has one or more, preferably all, advantages of low monomeric diisocyanate content, long pot-life, fast curing speed and comparable mechanical performance like bonding strength.

DETAILED DESCRIPTION OF THE INVENTION

It is to be understood by one of ordinary skill in the art that the present discussion is a description of exemplary embodiments only, and is not intended as limiting the broader aspects of the present invention. Each aspect so described may be combined with any other aspect or aspects unless clearly indicated to the contrary. In particular, any feature indicated as being preferred or advantageous may be combined with any other feature or features indicated as being preferred or advantageous.

Unless specified otherwise, in the context of the present invention, the terms used are to be construed in accordance with the following definitions.

Unless specified otherwise, all wt. % or % by weight values quoted herein are percentages by weight based on total weight of the adhesive composition.

Unless specified otherwise, as used herein, the terms "a", "an" and "the" include both singular and plural referents.

The terms "comprising" and "comprises" as used herein are synonymous with "including", "includes" or "containing", "contains", and are inclusive or open-ended and do not exclude additional, non-recited members, elements or process steps.

The term "consisting essentially of" as used herein means that the listed components constitute main body of the composition, for example, at least 80% by weight of the composition, at least 83% by weight of the composition, at least 85% by weight of the composition, or at least 90% by weight of the composition.

The term "at least one" or "one or more" used herein to define a component refers to the type of the component, and not to the absolute number of molecules. For example, "one or more polyols" means one type of polyol or a mixture of a plurality of different polyols.

The terms "about", "around" and the like used herein in connection with a numerical value refer to the numerical value ±10%, preferably ±5%.

Unless specified otherwise, the recitation of numerical end points includes all numbers and fractions subsumed within the respective ranges, as well as the recited end points.

All references cited in the present specification are hereby incorporated by reference in their entirety.

Unless otherwise defined, all terms used in the present invention, including technical and scientific terms, have the meaning as commonly understood by one of the ordinary skill in the art to which this invention belongs.

The number average molecular weight (Mn) used herein is determined by gel permeation chromatography (GPC) according to DIN 55672-1 with THF as the eluent. The weight average molecular weight (Mw) used herein is also determined by gel permeation chromatography (GPC).

The present invention provides a two-component solvent free polyurethane laminating adhesive composition, comprising, or consisting essentially of:
(A) an OH-containing component, and
(B) a NCO-containing component;
wherein the mass ratio between the OH-containing component (A) and the NCO-containing component (B) is greater than 1:1, and the molar ratio between the OH group in the component (A) and the NCO group in the component (B) is less than 1:1.

Hereinafter the components (A) and (B) will be described in detail.

(A) OH-Containing Component

Generally, there is no particular limitation on the OH-containing component useful in the present invention and it can be any OH-containing components conventionally used in the polyurethane adhesives, as long as the mass ratio of (A) and (B) is greater than 1:1 and the molar ratio of (A) and (B) is less than 1:1 and the objective of the present invention can be satisfied.

Preferably, the OH-containing component in the present invention has a low hydroxyl value (OHV), for example, in a range of 20-160 mgKOH/g, 50-150 mgKOH/g, 70-120 mgKOH/g, such as 60 mgKOH/g, 80 mgKOH/g, 90 mgKOH/g, 100 mgKOH/g, 110 mgKOH/g, 130 mgKOH/g.

Preferably, the OH-containing component in the present invention has an average OH functionality of 2 to 5, preferably 2.2 to 4.

In the present invention, the hydroxyl value (OHV) is defined as the number of milligrams of potassium hydroxide required to neutralize the acetic acid taken up on acetylation of one gram of the hydroxyl component, expressed in units of the mass of potassium hydroxide (KOH) in milligrams equivalent to the hydroxyl content of one gram of the hydroxyl component. In the present invention, the OHV is determined according to DIN 53240-2.

In the present invention, the OH-containing component may comprise one or more polyols (also known as polyhydric alcohols), and it is not required that each polyol has a hydroxyl value in the range of 20-160 mgKOH/g, 50-150 mgKOH/g, 70-120 mgKOH/g, such as 60 mgKOH/g, 80 mgKOH/g, 90 mgKOH/g, 100 mgKOH/g, 110 mgKOH/g, 130 mgKOH/g, as long as the total hydroxyl value of the whole OH-containing component falls in the range defined above. Preferably, the polyol(s) useful in the present invention has/have a hydroxyl value in the range defined above.

The term "polyol" used herein should be understood as a molecule carrying two or more hydroxyl groups, irrespective of whether the molecule contains other functional groups. However, a polyol useful in the present invention preferably contains only OH groups as functional groups, or if other functional groups are present, none of these other functional groups is reactive at least to isocyanates under the condition of the present invention.

In the present invention, the viscosity of the component (A) is not particularly limited, as long as it can ensure the adhesive application at low temperature such as no more than 60° C. From the perspective of end use, the viscosity of the component (A) preferably is in the range of 500-10000 mPa·s at 25° C., more preferably in the range of 500-5000 mPa·s at 25° C., for example, 600, 800, 1000, 1200, 1400, 1600, 2000, 2400, 2500, 2700, 3000, 3300, 3600, 3900, 4200, 4500, 4800 mPa·s at 25° C.

The OH-containing component of the present invention may comprise one or more polyols, and it is not required that each polyol has a viscosity in the range of 500-10000 mPa·s at 25° C., more preferably in the range of 500-5000 mPa·s at 25° C., for example, 600, 800, 1000, 1200, 1400, 1600, 2000, 2400, 2500, 2700, 3000, 3300, 3600, 3900, 4200, 4500, 4800 mPa·s at 25° C., as long as the final viscosity of the whole OH-containing component falls in the range defined above. Preferably, each polyol useful in the present invention has a viscosity in the range defined above.

Polyols that can be used in the present invention are not particularly limited, and those that are conventionally used in the preparation of polyurethane adhesives can be used in the present invention, such as polyether polyols, polyester polyols, polyether-ester polyols. Preferably, the OH-containing component of the present invention comprises or consists essentially of or consists of one or more polyether-ester polyols.

The polyether-ester polyols commonly used in the preparation of the polyurethane adhesives can be used in the present invention, as long as the finally obtained OH-containing component has an OHV in the range of 20-160 mgKOH/g, 50-150 mgKOH/g, 70-120 mgKOH/g, such as 60 mgKOH/g, 80 mgKOH/g, 90 mgKOH/g, 100 mgKOH/g, 110 mgKOH/g, 130 mgKOH/g and has a viscosity in the range of 500-10000 mPa·s at 25° C., more preferably in the range of 500-5000 mPa·s at 25° C., for example, 600, 800, 1000, 1200, 1400, 1600, 2000, 2400, 2500, 2700, 3000, 3300, 3600, 3900, 4200, 4500, 4800 mPa·s at 25° C. Preferably, each polyether-ester polyol useful in the present invention has an OHV and a viscosity in the ranges defined above.

Preferably, the polyether-ester polyol of the present invention contains repeat units derived from:
I) one or more polycarboxylic acids,
II) one or more $C_2$-$C_{15}$ monomeric polyols, and
III) one or more polyols containing ether groups with a number average molecular weight (Mn) of 200 Da to 4000 Da.

The polycarboxylic acids suitable to be used as component I) of the polyether-ester polyols are selected from C1-C15 aliphatic dicarboxylic acids such as malonic acid, succinic acid, glutaric acid, adipic acid, pimelic acid, suberic acid, sebacic acid, dodecanedioic acid and azelaic acid; C6-C20 aromatic dicarboxylic acids such as phthalic acid, isophthalic acid, terephthalic acid, diphenic acid and 2,6-Naphthalenedicarboxylic acid; and mixtures thereof.

The one or more $C_2$-$C_{15}$ monomeric polyols suitable as component II) can be selected from the group consisting of (i) unbranched aliphatic diols containing α,ω-terminal hydroxyl groups, which can optionally contain up to three ether groups, and (ii) polyols having a hydroxyl functionality no less than 2. Preferred monomeric polyols to be used in the present invention include ethylene glycol, diethylene glycol, triethylene glycol, propylene glycol, dipropylene glycol, tripropylene glycol, butylene glycol, dibutylene glycol, tributylene glycol, pentylene glycol, dipentylene glycol, tripentylene glycol, glycerin, trimethylolpropane, 2-methylpropylene glycol, and mixtures thereof.

The polyols suitable to be used as component III) are those polyols containing ether groups with a number average molecular weight (Mn) of 200 Da to 4000 Da, such as 300 Da, 400 Da, 500 Da, 600 Da, 800 Da, 1000 Da, 1500 Da, 1800 Da, 2000 Da, 2300 Da, 2600 Da, 3000 Da, 3300 Da, 3500 Da, 3800 Da. The polyols of component III) can be obtained in known manners, for example, by catalysed reaction of a starter compound containing at least one reactive hydrogen atom such as OH group with C1-C6 alkylene oxides, for example, ethylene oxide, propylene oxide, butylene oxide, styrene oxide, tetrahydrofuran or epichlorohydrin or mixtures of two or more thereof. The ether groups useful in the present invention preferably are derived from ethylene oxide, propylene oxide, butylene oxide, or mixtures of two of more thereof. Suitable starter compounds are preferably ethylene glycol, 1,2- or 1,3-propylene glycol, 1,4- or 1,3-butylene glycol, hexane-1,6-diol, octane-1,8-diol, neopentyl glycol, 1,4-hydroxylmethyl cyclohexane, or 2-methylpropane-1,3-diol.

In particular, the polyols to be used as component III) can be polyethylene glycol, polypropylene glycol, polybutylene glycol, polypentylene glycol, polyhexylene glycol, poly(ethylene oxide-co-propylene oxide) glycol, poly(ethylene oxide-co-butylene oxide) glycol, poly(ethylene oxide-co-pentylene oxide) glycol, poly(ethylene oxide-co-hexylene oxide) glycol, poly(propylene oxide-co-butylene oxide) glycol, poly(propylene oxide-co-pentylene oxide) glycol, poly(propylene oxide-co-hexylene oxide) glycol, poly(butylene oxide-co-pentylene oxide) glycol, poly(butylene oxide-co-hexylene oxide) glycol, and poly(pentylene oxide-co-hexylene oxide) glycol; and mixtures thereof.

Preferably, the polyether-ester polyol useful in the present invention has an average OH functionality of 2 to 5, preferably 2.2 to 4.

Preferably, the one or more polyether-ester polyols constitute(s) at least 70 wt. % of the component (A), such as at least 80 wt. % of the component (A), at least 90 wt. % of the component (A), or 100 wt. % of the component (A).

(B) NCO-Containing Component

The NCO-containing component useful in the present invention are not particularly limited, as long as it is commonly used in the preparation of polyurethane adhesives. Preferably, the NCO group content in the component (B) is in the range of 8 wt. % to 25 wt. %, preferably 10-20 wt. %, such as 13 wt. %, 15 wt. %, and 18 wt. %, based on the component (B), determined according to ISO 14896/3.

Preferably, the component (B) comprises, consists essentially of, or consists of one or more NCO-terminated polyurethane (PU) prepolymers. It is not required that each NCO-terminated PU prepolymer has a NCO group content in the range of 8 wt. % to 25 wt. %, preferably 10-20 wt. %, such as 13 wt. %, 15 wt. %, and 18 wt. %, as long as the total NCO group content of the whole NCO-containing component falls in the range defined above. Preferably, the NCO-terminated PU prepolymer(s) useful in the present invention has/have a NCO group content in the range defined above.

The NCO-terminated PU prepolymers useful in the present invention are obtained by reacting a polyol or a polyol mixture with a stoichiometric excess of polyisocyanate. The polyols used in the preparation of the prepolymer may be any and all polyols commonly used for polyurethane synthesis, e.g., polyester polyols, polyether polyols, polyester ether polyols, polycarbonate polyols, or mixtures of two or more thereof.

Polyether polyols can be produced from a large number of alcohols which contain one or more primary or secondary alcohol groups. As initiators for the production of the polyethers, the following compounds, for example, or mixtures of these compounds, may be used: water, ethylene glycol, propylene glycol, glycerol, butanediol, butanetriol, trimethylolethane, pentaerythritol, hexanediol, 3-hydroxyphenol, hexanetriol, trimethylolpropane, octanediol, neopentyl glycol, 1,4-hydroxymethylcyclohexane, bis(4-hydroxyphenyl) dimethylmethane, and sorbitol. Ethylene glycol, propylene glycol, glycerol, and trimethylolpropane are preferably used. Suitable as cyclic ethers for the production of the polyethers described above are alkylene oxides, such as ethylene oxide, propylene oxide, butylene oxide, epichlorohydrin, styrene oxide, or tetrahydrofuran, or mixtures of these alkylene oxides.

Polyester polyols may be produced, for example, by reacting low molecular weight alcohols, in particular ethylene glycol, diethylene glycol, neopentyl glycol, hexanediol, butanediol, propylene glycol, glycerol, or trimethylolpropane with caprolactone. Also suitable as polyfunctional alcohols for producing polyester polyols are 1,4-hydroxymethylcyclohexane, 2-methyl-1,3-propanediol, 1,2,4-butanetriol, triethylene glycol, tetraethylene glycol, polyethylene glycol, dipropylene glycol, polypropylene glycol, dibutylene glycol, and polybutylene glycol.

Other suitable polyester polyols can be produced by polycondensation. For instance, difunctional and/or trifunctional alcohols can be condensed with a substoichiometric quantity of dicarboxylic acids or tricarboxylic acids, mixtures of dicarboxylic acids or tricarboxylic acids, or reactive derivatives thereof, to form polyester polyols. Suitable dicarboxylic acids are, for example, adipic acid or succinic acid and higher homologues thereof with up to 16 C atoms, and also unsaturated dicarboxylic acids, such as maleic acid or fumaric acid, as well as aromatic dicarboxylic acids, in particular the isomeric phthalic acids, such as phthalic acid, isophthalic acid or terephthalic acid. Examples of suitable tricarboxylic acids include citric acid or trimellitic acid. The aforementioned acids can be used individually or as mixtures of two or more thereof. Particularly suitable alcohols are hexanediol, butanediol, ethylene glycol, diethylene glycol, neopentyl glycol, 3-hydroxy-2,2-dimethylpropyl 3-hydroxy-2,2-dimethylpropanoate, or trimethylolpropane, or mixtures of two or more thereof. Instead of free polycarboxylic acids, (if possible) the corresponding polycarboxylic anhydrides or corresponding polycarboxylic acid esters with alcohols having preferably 1 to 3 C atoms can also be used. The polycarboxylic acids may be aliphatic, cycloaliphatic, aromatic, or heterocyclic, or both. Examples of suitable polycarboxylic acids include succinic acid, adipic acid, suberic acid, azelaic acid, sebacic acid, dodecanedioic acid, phthalic acid, isophthalic acid, terephthalic acid, trimellitic acid, phthalic anhydride, tetrahydrophthalic anhydride, hexahydrophthalic anhydride, tetrachlorophthalic anhydride, endomethylene tetrahydrophthalic anhydride, glutaric anhydride, maleic acid, maleic anhydride, fumaric acid, dimer fatty acid, or trimer fatty acid, or mixtures of two or more thereof.

It is also possible to use polyester polyols of oleochemical origin. Such polyester polyols may, for example, be produced by complete ring opening of epoxidized triglycerides of a fat mixture containing at least in part an unsaturated fatty acid with one or more alcohols having 1 to 12 C atoms and subsequent partial transesterification of the triglyceride derivatives to yield alkyl ester polyols having 1 to 12 C atoms in the alkyl residue.

Polycarbonate polyols may, for example, be obtained by the reaction of diols, such as propylene glycol, 1,4-butanediol or 1,6-hexanediol, diethylene glycol, triethylene glycol or tetraethylene glycol or mixtures of two or more of these diols with diaryl carbonates, for example diphenyl carbonates, or phosgene.

Polyether-ester polyols useful in the preparation of the PU prepolymer include for example those described above in the component (A).

The molecular weight of the polyols used to synthesize the PU prepolymer is preferably in the range of 100 to 20000 g/mol, in particular, 100 to 4500 g/mol, such as 150, 200, 400, 800, 1000, 1500, 1800, 2000, 2200, 2600, 3000, 3300, 3500, 3800, 4000, 4300 g/mol. The mean OH functionality may be in the range of 2 to 5, preferably 2.2 to 4.5.

The stoichiometric excess of polyisocyanate to polyol is—in relation to the molar ratio of NCO groups to OH groups—in particular, 1:1 to 1.8:1, preferably 1:1 to 1.6:1, and especially preferably 1.05:1 to 1.5:1.

Due to the excess isocyanate used, the NCO-terminated PU prepolymers usually have certain amounts of isocyanate monomers, i.e., in particular, aromatic polyisocyanate monomers, such as, for example, MDI, typically in amounts of 0.1 to 25 wt. % in relation to the total weight of prepolymers and monomers.

The molecular weight (Mn) of the prepolymer is in the range of 200 to 100,000 g/mol, such as 200 to 10,000 g/mol, 200 to 5000 g/mol, 300 to 3000 g/mol, 400 to 2000 g/mol, 500 to 1500 g/mol.

Preferably, the one or more NCO-terminated polyurethane prepolymers constitute(s) at least 70 wt. % of the component (B), such as at least 80 wt. % of the component (B), at least 90 wt. % of the component (B), or at least 95 wt. % of the component (B).

"Reversed Mix-Ratio" of Components (A) and (B)

To achieve the desirable effects of the polyurethane adhesives of the present invention, such like low total diisocyanate content, long pot-life, fast curing speed and comparable mechanical performance, the mass ratio between the OH-containing component (A) and the NCO-containing component (B) should be greater than 1:1, for example in the range of 1:1 to 4:1, such as 1.2:1, 1.5:1, 2:1, 2.5:1, 3.0:1, 3.5:1; and the molar ratio between the OH group in the component (A) and the NCO group in the component (B) should be less than 1:1, for example in the range of 1:1 to 1:2, such as 1:1.2, 1:1.3, 1:1.5, 1:1.6, 1:1.7, 1:1.8. In the present invention, such a reversed mix manner of mass ratio and molar ratio is called as "reversed mix-ratio", and the obtained adhesives are also called as "reversed mix-ratio" adhesives.

For example, using the same NCO-containing component which contains 15% monomeric isocyanates, when the NCO-containing component is mixed with the OH-containing component in a mass ratio of 100:50, total free monomeric isocyanates in the adhesive is 10%; when the NCO-containing component is mixed with the OH-containing component in a mass ratio of 100:100, total free monomeric isocyanates in the adhesive is 7.5%; when the NCO-containing component is mixed with the OH-containing component in a mass ratio of 100:200, total free monomeric isocyanates in the adhesive is 5%.

The contents of components (A) and (B) in the two-component adhesive composition are not particularly limited, as long as the above reversed mix-ratio is satisfied.

In addition to the above components (A) and (B), the polyurethane laminating adhesive composition of the present invention may comprise conventional additives, such as tackifiers, stabilizers, cross-linking agent, viscosity regulator, pigments, plasticizers or antioxidants.

The conventional additives may be, independently of each other, comprised in one of or both of the components (A) and (B).

In another aspect of the invention, there is provided a method of bonding together two flexible substrates, the method including mixing the two components of adhesive composition according to the present invention and applying the mixed adhesive composition to at least one of the substrates and then mating together the substrates for a time sufficient to permit the adhesive to fixture.

The two components of the PU laminating adhesive of the present application are mixed prior to use, and then applied to at least one of the flexible substrates to be bonded such as films, and then the substrates are laminated together. The quantities of the adhesive typically are around 1-5 g/m².

In yet another aspect of the invention, there is provided reaction products of the adhesive composition according to the present invention.

In yet another aspect of the invention, provided is an article obtained from the method of the present invention, comprising the cured product of the present invention, or produced using the adhesive composition of the present invention.

EXAMPLES

The following examples are intended to assist one skilled in the art to better understand and practice the present invention. The scope of the invention is not limited by the examples but is defined in the appended claims. All parts and percentages are based on weight unless otherwise stated.

Acid Value Determination

The acid value was determined according to ASTM D4662-93: Standard Test Method for Polyurethane Raw Materials: Determination of Acid and Alkanlinity Numbers of Polyols.

Specifically, an amount of sample was weighted into a 150 ml Erlenmeyer flask, then it was dissolved in 50 ml of pre-neutralized ethanol/diethyl ether 50:50 (v/v) solvent mixture. After sample was fully dissolved and a pause of 30 seconds, the solution was titrated using c(KOH)=0.1 mol/L in ethanol as titrant and phenolphthalein as indicator. Titration stopped when the solution turned red, the consumed volume of titrant was recorded as $V_{EP}$. Acid value (AV) can be calculated by following equation.

$$AV = \frac{V_{EP} \times f \times c(\text{KOH}) \times M_{KOH}}{m_s}$$

AV: Acid value of the sample in mg KOH/g $V_{EP}$: Titrant consumption in mL when the solution turned red.

c(KOH): Concentration of titrant in mol/L, here c(KOH) is 0.1 mol/L f: the correction factor of titrant without unit, $M_{KOH}$: molecular weight of KOH, here is 56.11 g/mol $m_s$: weight of sample in g Hydroxyl Value (OHV) Determination The hydroxyl value was determined according to DIN 53240-2: Determination of hydroxyl value—Part 2: method with catalyst.

Specifically, the Following Reagents were Firstly Prepared:

Titrant: Potassium hydroxide solution, 0.5 mol/L in methanol, (from Sinopharm, ready to use)

Acetylation mixture: Acetic anhydride solution, 10% NMP (stored in amber glass bottle)

Catalyst solution: 4-N-Dimethylaminopyridine, 1% in NMP.

Three samples were prepared by weighing appropriate sample amount into 150 ml Erlenmeyer flasks, and two empty 150 ml Erlenmeyer flasks were used as blank samples. 30 mL Catalyst Solution and 10 mL Acetylation mixture were added into each Erlenmeyer flask, sealed for 15 minutes under stirring, then 3 mL of de-ionized water were added and sealed for another 12 minutes under stirring. All samples and blank solutions were titrated using c(KOH) =0.5 mol/L in methanol as Titrant and phenolphthalein as indicator. Titration stopped when the solution turned in red, the consumed volume of titrant was recorded, the average consumption of two blanks was taken as $V_{blank}$. Hydroxyl value (OHV) can be calculated by following equation.

$$OHV = \frac{(V_{EP} - V_{Blank}) \times f \times c(KOH) \times M_{KOH}}{m_s} + AV$$

OHV: Hydroxyl value in mg KOH/g

AV: Acid value of the sample in mg KOH/g $V_{EP}$: Titrant consumption of sample in mL when the solution turned in red.

$V_{Blank}$: Average titrant consumption of 2 blanks in mL when the solution turned in red c(KOH): Concentration of titrant in mol/L, here c(KOH) is 0.5 mol/L f: the correction factor of titrant without unit, $M_{KOH}$: molecular weight of KOH, here is 56.11 g/mol $m_s$: weight of sample in g OH Functionality Determination:

The OH functionality was calculated through following equation:

$$F_n = \frac{\sum N_{OH} - \sum N_{COOH}}{\sum N_{monomer} - \sum N_{COOH}}$$

$F_n$: Average OH functionality of polyester polyol.

$N_{OH}$: Molar equivalent of all hydroxyl groups in formula.

$N_{COOH}$: Molar equivalent of all carboxylic acid groups in formula $N_{Monomer}$: Molar equivalent of all monomers in formula Viscosity Test Method:

Viscosity at 25° C. was tested using Brookfield viscometer LVT with #63 spindle, Viscosity at 40° C. was tested using Brookfield viscometer DV2T with #27 spindle and equipped with thermoset heating attachment.

NCO % Determination

The NCO % was determined according to ISO 14896/3: Plastics-Polyurethane raw materials—Determination of isocyanate content.

Specifically, the Following Reagents were Firstly Prepared:

Titrant: hydrochloride aqueous solution, 1 mol/L in methanol, (from Sinopharm, ready to use)

Reaction solution: Dibutyl amine solution 1 mol/L in anhydrous toluene (stored in amber glass bottle)

An appropriate amount of the sample (~2 g) was weighted into a vessel. 30 mL toluene were added to dissolve it. 20 mL reaction solution were added, the vessel was sealed, and reaction took place for 10 min under the magnetically stirring. Afterwards 30 mL of methanol were added and the excess of dibutylamine was back titrated with Titrant. NCO % is calculated though following equation:

$$NCO\% = \frac{(V_{Blank} - V_{EP}) \times f \times c(HCl) \times M_{NCO}}{1000 \times m_s} \times 100\%$$

NCO %: Isocyanate content of the sample $V_{EP}$: Titrant consumption of sample in mL $V_{Blank}$: Titrant consumption of blank in mL c(HCl): Concentration of titrant in mol/L, here c(HCl) is 1.0 mol/L f: the correction factor of titrant without unit, $M_{NCO}$: molecular weight of NCO, here is 42.02 g/mol $m_s$: weight of sample in g 1000: Conversion factor from g to mg.

Procedure for Preparing Polyether-Ester Polyols

To a 3 L of 4-neck reaction vessel equipped with mechanical stirrer, nitrogen inlet, thermometer and fraction distillation system, were firstly added dicarboxylic acid and polyether polyol in amounts as shown in Tables 1a and 1b, purged with nitrogen gas, then heated to 210° C. under nitrogen atmosphere and kept at this temperature until temperature began to drop and no water was distilled out. Reaction mixture was then cooled to 170 Cp and then monomeric polyol was added to the vessel in an amount as shown in Tables 1a and 1b, and then reaction mixture was slowly heated to 230° C. over 4 hrs, and was kept at 230° C. for 2 hrs. Then, the vessel was vacuumized from 600 mbar to 200 mbar in 8 hrs while kept at 230° C., and then set at 200 mbar and 230° C. for another 4 hrs, until acid value lower than 3 mgKOH/g, to obtain a polyether-ester polyol. The hydroxyl value, and viscosity of the obtained polyether-ester polyol were tested using the above-mentioned methods and shown in Tables 1a and 1b. All parts in Tables 1a and 1b are parts by weight TABLE 1a

| No. | Dicarboxylic acid | Monomeric polyol | Polyether polyol |
|---|---|---|---|
| P1 | Adipic acid, 34.55 parts | Diethylene glycol, 21.87 parts glycerine, 1.52 parts | Polypropylene glycol, Mn = 450 Da, 42.06 parts |
| P2 | Adipic acid, 32.28 parts | Diethylene glycol, 23.43 | Poly(ethylene oxide-co-propylene |

TABLE 1a-continued

| No. | Dicarboxylic acid | Monomeric polyol | Polyether polyol |
|-----|---|---|---|
|  |  | parts glycerine, 1.82 parts | oxide) glycol, Mn = 750 Da, 42.46 parts |
| P3 | Adipic acid, 35.29 parts | Diethylene glycol, 20.36 parts glycerine, 2.56 parts | Polypropylene glycol, Mn = 450 Da, 41.78 parts |
| P4 | Adipic acid, 30.57 parts Isophthalic acid, 5.11 parts | Diethylene glycol, 20.24 parts Glycerine, 2.55 parts | Polypropylene glycol, Mn = 450 Da, 41.53 parts |
| P5 | Adipic acid, 29.62 parts Isophthalic acid, 4.95 parts | Diethylene glycol, 20.87 parts Glycerine, 1.65 parts | Polypropylene glycol, Mn = 450 Da, 42.91 parts |
| P6 | Adipic acid, 25.92 parts Isophthalic acid, 10.16 parts | Diethylene glycol, 20.12 parts Glycerine, 2.53 parts | Polypropylene glycol, Mn = 450 Da, 41.28 parts |
| P7 | Adipic acid 36.15 parts | Diethylene glycol, 16.41 parts Glycerine, 5.69 Parts | Polypropylene glycol, Mn = 450 Da, 41.75 Parts |
| P8 | Adipic acid, 18.98 parts Isophthalic acid, 10.79 parts | Diethylene glycol, 17.92 parts Glycerine, 3.59 parts | Poly(ethylene oxide-co-propylene oxide) glycol, Mn = 750 Da, 48.71 parts |
| P9 | Adipic acid, 19.32 parts Isophthalic acid, 10.98 parts | Diethylene glycol, 14.03 parts glycerine, 6.09 parts | Poly(ethylene oxide-co-propylene oxide) glycol, Mn = 750 Da, 49.58 parts |
| P10 | Adipic acid, 30.30 parts | Diethylene glycol, 14.67 parts Glycerine, 3.18 parts | Poly(ethylene oxide-co-propylene oxide) glycol, Mn = 750 Da, 51.84 parts |
| P11 | LOCTITE Liofol LA 6028, from Henkel | | |
| P12 | LOCTITE Liofol LA 6026, from Henkel | | |
| P13 | Henkel product PE-501 | | |
| P14 | 5103-700A, from Eternal Resin Co. | | |

TABLE 1b

| No. | Hydroxyl value (mgKOH/g) | OH Functionality | Viscosity mPa · s at 25° C. |
|---|---|---|---|
| P1 | 101 | 2.2 | 1250 |
| P2 | 100 | 2.26 | 1200 |
| P3 | 106 | 2.4 | 1552 |
| P4 | 98 | 2.4 | 2350 |
| P5 | 101 | 2.2 | 1400 |
| P6 | 98 | 2.4 | 2700 |
| P7 | 105 | 3 | 1700 |
| P8 | 112 | 2.5 | 2700 |
| P9 | 110 | 3 | 4500 |
| P10 | 57 | 3 | 4100 |
| P11 | 210 | 2.25 | 850 |
| P12 | 180 | 2.26 | 2100 |
| P13 | 145 | 4 | 4300 |
| P14 | 210 | 2.5 | 2000 |

(A) is the OH-Containing Component
- A1: P1
- A2: P2
- A3: P3
- A4: P4
- A5: P5
- A6: P6
- A7: P7
- A8: P8
- A9: P9
- A10: P10
- A11 (reference): P11
- A12: P12
- A13: 90 parts by weight of P7 and 10 parts by weight of castor oil (OHV: 154 mgKOH/g); OHV of A13=110 mgKOH/g; viscosity=2700 mPa·s at 25° C.;
- A14: 88 parts by weight of P6 and 10 parts by weight of P13 and 2 parts by weight of polyether polyol (Purchased from Kukdo Chemicals Co., Ltd., Trade name GY-600E); OHV of A14=118 mgKOH/g;
- A15: 68 parts by weight of P6 and 30 parts by weight of P13 and 2 parts by weight of polyether polyol (Purchased from Kukdo Chemicals Co., Ltd., Trade name GY-600E); OHV of A15=120 mgKOH/g;
- A16: 48 parts by weight of P6 and 50 parts by weight of P14 and 2 parts by weight of polyether polyol (Purchased from Kukdo Chemicals Co., Ltd., Trade name GY-600E); OHV of A16=122 mgKOH/g;
- A17 (reference): 70 parts by weight of P14 and 30 parts by weight of polyether polyol ((Purchased from Kukdo Chemicals Co., Ltd., Trade name GY-440)); OHV of A17=240 mgKOH/g; viscosity=1500 mPa·s at 25° C.

(B) Is the NCO-Containing Component
- B1: 40 parts by weight of P12 and 60 parts by weight of Covestro Desmodur®2460M (from Covestro AG, 50% to 60% 2,4'-MDI, >=40% 4,4'-MDI and <0.8% 2,2'-MDI) were mixed and slowly heated to 70° C.; stop heating when NCO % is lower than 16 wt. %; final NCO % was 15.5 wt. %, and viscosity was 2500 mPa·s at 40° C.;
- B2: 29 parts by weight of PPG1000, 6 parts by weight of PPG450, 5 parts by weight of castor oil (OHV: 150-160 mgKOH/g), 12 parts by weight of Covestro Desmodur® 01181 (from Covestro AG, >98% 4,4'-MDI and <1.8% 2,4'-MDI isomer), 48 parts by weight of Covestro Desmodur® 2460M were mixed and slowly heated to 70° C.; stop heating when NCO % is lower than 16.5 wt. %; final NCO % was 16.0 wt. %, and viscosity was 1200 mPa·s at 40° C.;
- B3: 50 parts by weight of P6 and 50 parts by weight of Covestro Desmodur® 2460M were mixed and slowly heated to 70° C.; stop heating when NCO % is lower than 13 wt. %; final NCO % was 13.0 wt. %, and viscosity was 4060 mPa·s at 40° C.

Two-Component Solvent Free PU Adhesives:

Each of the adhesives was obtained by mixing the OH-containing component and the NCO-containing component in the amounts as listed in Tables 2a and 2b.

TABLE 2a

| | Component (A) | | Component (B) | |
|---|---|---|---|---|
| | No. | OHV | No. | NCO % |
| Control 1 | A11 | 215 | B1 | 15.50% |
| Ex. 1 | A14 or A15 or A16 | 120 ± 5 | B1 | 15.50% |
| Ex. 2 | A8 or A9 or A13 | 110 ± 5 | B1 | 15.50% |
| Ex. 3 | A1 or A2 or A3 or A4 or A5 or A6 or A7 | 100 ± 5 | B1 | 15.50% |
| Ex. 4 | A10 | 57 | B1 | 15.50% |
| Control 2 | A17 | 240 | B2 | 16.00% |
| Ex. 5 | A14 or A15 or A16 | 120 ± 5 | B2 | 16.00% |
| Ex. 6 | A8 or A9 or A13 | 110 ± 5 | B2 | 16.00% |
| Ex. 7 | A1 or A2 or A3 or A4 or A5 or A6 or A7 | 100 ± 5 | B2 | 16.00% |
| Ex. 8 | A10 | 57 | B2 | 16.00% |
| Control 3 | A17 | 240 | B3 | 13.00% |
| Ex. 9 | A14 or A15 or A16 | 120 ± 5 | B3 | 13.00% |
| Ex. 10 | A8 or A9 or A13 | 110 ± 5 | B3 | 13.00% |
| Ex. 11 | A1 or A2 or A3 or A4 or A5 or A6 or A7 | 100 ± 5 | B3 | 13.00% |
| Ex. 12 | A10 | 57 | B3 | 13.00% |

TABLE 2b

| | (A):(B) Mass ratio | OH:NCO Molar ratio | Diisocyanate content**, wt. % | Diisocyanate Save % | Free NCO %***, wt. % | Reduced NCO % |
|---|---|---|---|---|---|---|
| Control 1 | 65:100 | 1:1.5 | 36.36% | Benchmark | 9.39% | Benchmark |
| Ex. 1 | 115:100 | 1:1.5 | 27.91% | 23.26% | 7.21% | 23.26% |
| Ex. 2 | 125:100 | 1:1.5 | 26.67% | 26.67% | 6.89% | 26.67% |
| Ex. 3 | 135:100 | 1:1.5 | 25.53% | 29.79% | 6.60% | 29.79% |
| Ex. 4 | 250:100 | 1:1.5 | 17.14% | 52.86% | 4.43% | 52.86% |
| Control 2 | 60:100 | 1:1.5 | 37.50% | Benchmark | 10.00% | Benchmark |
| Ex. 5 | 120:100 | 1:1.5 | 27.27% | 27.27% | 7.27% | 27.27% |
| Ex. 6 | 130:100 | 1:1.5 | 26.09% | 30.43% | 6.96% | 30.43% |
| Ex. 7 | 140:100 | 1:1.5 | 25.00% | 33.33% | 6.67% | 33.33% |
| Ex. 8 | 250:100 | 1:1.5 | 17.14% | 54.29% | 4.57% | 54.29% |
| Control 3 | 50:100 | 1:1.5 | 33.33% | Benchmark | 8.67% | Benchmark |
| Ex. 9 | 100:100 | 1:1.5 | 25.00% | 25.00% | 6.50% | 25.00% |
| Ex. 10 | 105:100 | 1:1.5 | 24.39% | 26.83% | 6.34% | 26.83% |
| Ex. 11 | 115:100 | 1:1.5 | 23.26% | 30.23% | 6.05% | 30.23% |
| Ex. 12 | 200:100 | 1:1.5 | 16.67% | 50.00% | 4.33% | 50.00% |

**Diisocyanate content: the total weight of diisocyanate component is divided by total weight of the adhesive mixture. For example, in Control 1, the diisocyanate component (i.e. mix-MDI) constitutes 60% by weight of B1. When component A is mixed with component B in a mass ratio of A in 65:100, the diisocyanate content is 60% * 100/(100 + 65) = 36.36%.
***Free NCO %: Free NCO % is defined as the content of NCO groups in the adhesive mixture when component A and component B are first mixed. Free NCO groups will react with OH groups, moisture, amine groups or reactants. Free NCO % is calculated by NCO % * weight (B)/weight (A + B). For example, in Control 1, Free NCO % = 15.5% * 100/(65 + 100) = 9.39%.

Lamination adhesives were formed from Control 1 (by mixing A11 and B1), Control 2 (by mixing A17 and B2), Example 3-A2 (by mixing A2 and B1), Example 2-A8 (by mixing A8 and B1), Example 6-A8 (by mixing A8 and B12), and Example 6-A13 (by mixing A13 and B2).

Each adhesive was heated to 40° C., and viscosity was checked initially and at 5 minutes intervals. Results are shown in Table 3:

TABLE 3

| Minutes | Control 1 (A11 + B1) Viscosity* | Control 2 (A17 + B2) Viscosity* | Ex.2-A8 (A8 + B1) Viscosity* | Ex.3-A2 (A2 + B1) Viscosity* | Ex.6-A8 (A8 + B2) Viscosity* | Ex6-A13 (A13 + B2) Viscosity* |
|---|---|---|---|---|---|---|
| 0 | 1530 | 985 | 2140 | 1430 | 1710 | 1280 |
| 5 | 1635 | 1075 | 2225 | 1490 | 1775 | 1350 |
| 10 | 2000 | 1275 | 2470 | 1630 | 1980 | 1585 |
| 15 | 2540 | 1535 | 2785 | 1840 | 2275 | 1930 |
| 20 | 3220 | 1925 | 3160 | 2095 | 2620 | 2370 |
| 25 | 4040 | 2330 | 3540 | 2365 | 3010 | 2910 |
| 30 | 5075 | 2770 | 3975 | 2640 | 3435 | 3530 |
| 35 | 6150 | 3280 | 4600 | 2935 | 3900 | 4425 |
| 40 | 7450 | 3830 | 5150 | 3230 | 4475 | 5275 |
| 45 | 8850 | 4575 | 5675 | 3535 | 5000 | 6275 |
| 50 | 10450 | 5250 | 6225 | 3850 | 5600 | 7350 |

*Viscosity (in mPa · s) at 40° C. versus time

As shown in Table 3, the pot-lifes of the "reversed mix-ratio" adhesives in Example 3-A2, Example 2-A8, and Example 6-A8 of the present invention were longer than 30 minutes, and the pot life of Example 6-A13 was longer than 20 minutes, whereas the conventional lamination adhesive systems of Control 1 and Control 2 were less than 20 minutes. The viscosity of conventional adhesive Control 1(B1/A11) increased in a much faster speed and reached 5000 mPa·s in less than 30 minutes, while it took almost 40 minutes for the "reversed mix-ratio" adhesive Example 2-A8 (B1+A8), and more than 50 minutes for Example 3-A2 (B1+A2) to reach 5000 mPa·s, which indicates the "reversed mix-ratio" lamination adhesive has longer pot-life as well as open time, thus easier to handle in laminating operation and easier to be cleaned.

Curing Speed

The curing speed in the present invention is characterized by the NCO peak strength of the lamination adhesive by FT-IR at ~2270 cm$^{-1}$ over time. This could give the chemically curing speed of the lamination adhesive.

Figure 1A:
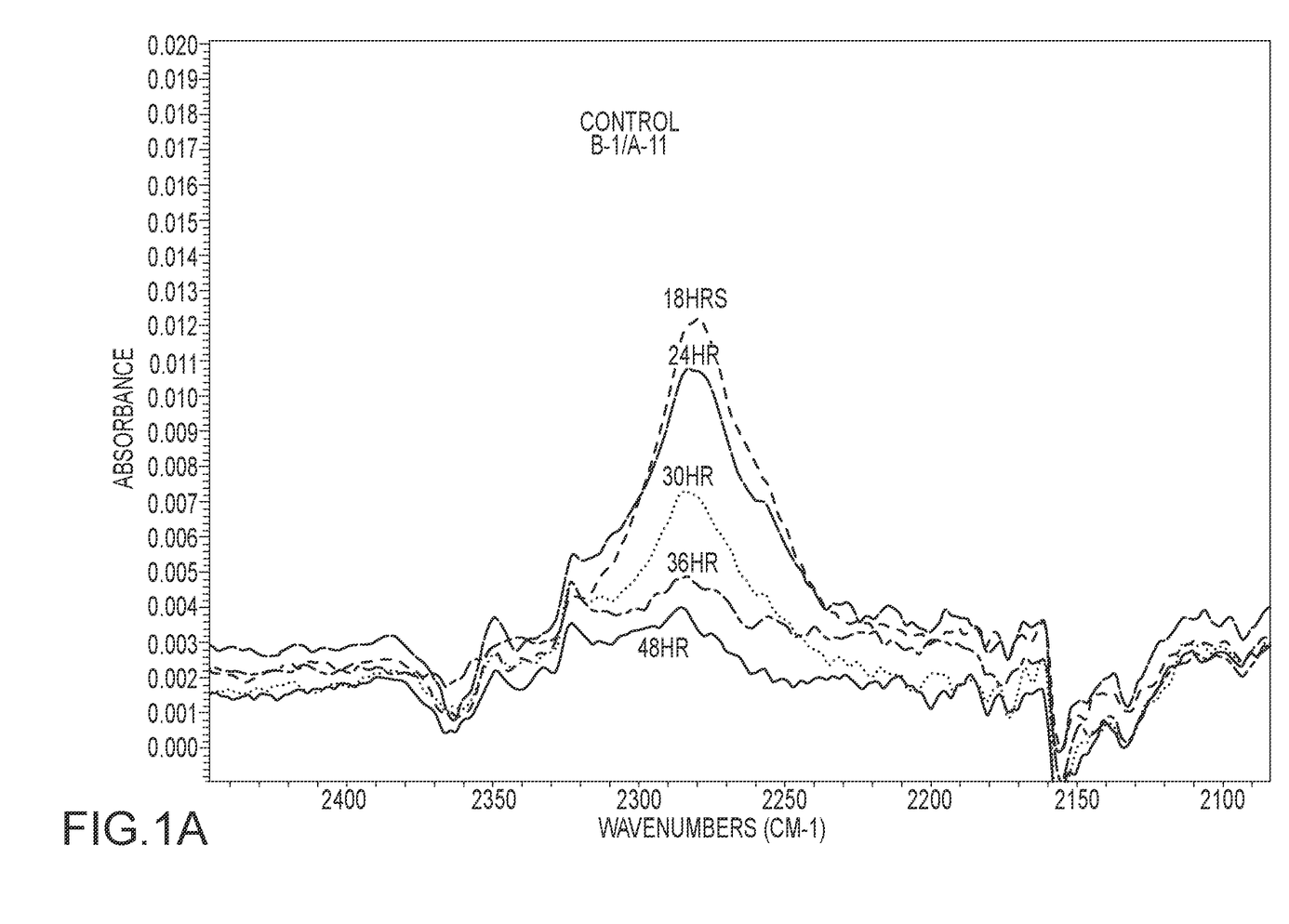
FIG. 1A is a series of FT-IR scans showing curing of the control 1 composition.
Figure 1B:
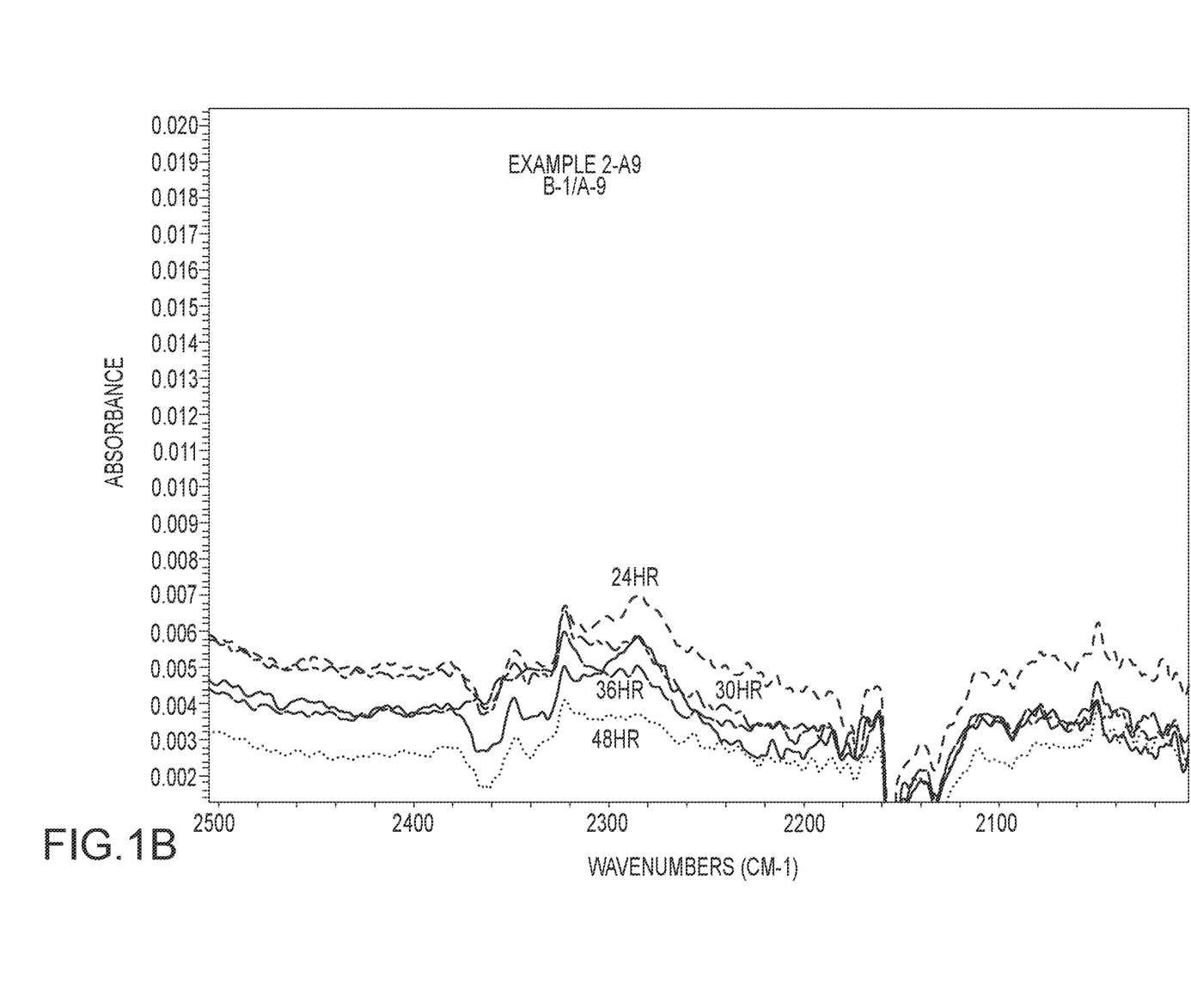
FIG. 1B is a series of FT-IR scans showing curing of the Example 2-A9 composition.

Lamination adhesives were formed from Control 1 (by mixing A11 and B1) and Example 2-A9 (by mixing A9 and B1). A sheet of 12 μm-thick aluminum foil was bonded to a sheet of 40 μm-thick polyethylene film using each adhesive of control 1 and Example 2, to form two laminates. The laminates were cured at 40° C. oven, and 15 mm-width strips were taken from the laminates at 18 hours, 24 hours, 30 hours, 36 hours and 48 hours, respectively. The laminate strips were separated by 180° peeling to ensure adhesion fracture, so all adhesives were remained on surface of polyethylene film. FT-IR spectrums of the adhesives were collected on a Thermo iS5 FT-IR spectrometer, and spectrum profiles collected at 18 hours, 24 hours, 30 hours, 36 hours and 48 hours were stacked over time respectively.

Spectrum profiles of control 1 was shown in FIG. 1A, wherein after 24 hours curing, there was still very strong absorption at 2270 cm$^{-1}$, which indicates high content of residue NCO groups in the adhesive, and after 48 hours curing, this peak still did not completely disappear. In contrast, as shown in FIG. 1B, very weak absorption peak at 2270 cm$^{-1}$ was observed after 24 hours curing, and was undistinguishable from baseline after 48 hours curing, which indicates much faster curing speed of the adhesive of the present invention compared with conventional lamination adhesive control 1. Although the pot-life curves in FIG. 1A showed faster increase of the viscosity for the conventional lamination adhesive (control 1), curing speed tests showed that more free NCO content requires longer time to be fully cured.

Primary Aromatic Amines (PAA) Migration

FDA Compliance and EU regulations require that the migration of PAA from a flexible packaging material to the packed food must be in an undetectable level, or below the detection limit (2 part per billion in food simulant, 2 ppb) of the migration test, using BfR test method. As stated above, PAA generate when excess monomeric isocyanates react with moisture. Thus, high level excess isocyanates can lead to excessive primary aromatic amines and require longer curing time to pass migration test.

Lamination adhesives were formed from Control 1 (by mixing A11 and B1), Example 2-A8 (by mixing A8 and B1) and Example 2-A9 (by mixing A9 and B1).

A plurality of printed PET/vmPET laminates were laminated with sheets of 40 µm polyethylene film using each of conventional adhesive (control 1) and "reversed mix-ratio" adhesives (Example 2). These laminates were cured in 40° C. oven, and pouches with 400 cm$^2$ surface area were made with these flexible laminating films after 24 hours and 48 hours curing. PAA migration levels were immediately measured using BfR test method after the pouches were made. The results are listed in Table 4.

TABLE 4

| BfR PAA Migration test method results(<2 ppb) | | |
|---|---|---|
| | 24 hrs | 48 hrs |
| Control 1 (B1 and A11) | fail | pass |
| Ex. 2-A8 (B1 and A8) | pass | pass |
| Ex. 2-A9 (B1 and A9) | pass | pass |

As shown in Table 4, the PAA migration test results confirmed that lower total diisocyanate content requires shorter time to reach undetectable level of PAA migration. Even with the same molar ratio index of isocyanate group to hydroxyl group and cured under ideal condition such as in 40° C. oven, open contact with moisture in air, the conventional laminating adhesive still required 48 hours curing to reach undetectable level of PAA migration. The "reversed mix-ratio" laminating adhesives of the present invention cured much faster, thus passed the PAA migration test after 24 hours curing.

Bonding Strength

Lamination adhesives were formed from Control 1 (by mixing A11 and B1), Example 2-A9 (by mixing A9 and B1), Example 2-A8 (by mixing A8 and B1) and Example 6-A9 (by mixing A9 and B2).

These adhesives were used to make laminates. Each of the laminates was made of a pre-laminated BOPP//vmPET laminate film to 80 µm low density polyethylene film at an adhesive coating weight of about 1.7 gsm. After lamination finished, each of the laminates were cured in 40° C. oven for 48 hours. The bonding strength (BS) was measured on both machine direction (MD) and thread direction (TD), and summarized in Table 5. In the present invention, BS was tested on a Instron Universal tensile tester, Specimen was cut into 15 mm strips, Peeling seed is 100 mm/min, peeling angle is 90°, Data were recorded as the average value of 3 measurements.

TABLE 5

| | MD BS (N/15 mm) | TD BS (N/15 mm) |
|---|---|---|
| Control 1 (B1 and A11) | 2.94146 | 3.066673 |
| Ex. 2 (B1 and A9) | 2.931807 | 3.20796 |
| Ex. 6 (B2 and A9) | 2.60557 | 3.3839 |
| Ex. 2 (B1 and A8) | 3.21803 | 3.757153 |

It can be surprisingly seen from these data that even with lower NCO content in the adhesives of the present invention, they still exhibit a bonding strength comparable to the conventional adhesive having higher NCO content, which is an unexpected effect.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A two-component, solvent free polyurethane adhesive composition comprising:
    (A) an OH-containing component; and
    (B) a NCO-containing component, wherein:
        the mass ratio between the OH-containing component (A) and the NCO-containing component (B) is greater than 1:1,
        the molar ratio between the OH group in the OH-containing component (A) and the NCO group in the NCO-containing component (B) is less than 1:1, and
        the OH-containing component (A) comprises at least 90 wt. % of one or more polyether-ester polyols having a hydroxyl value of 70 to 150 mg KOH/g.

2. The composition of claim 1, wherein the NCO-containing component (B) has an NCO group content of 8 wt. % to 25 wt. %, based on the total weight of the NCO-containing component (B).

3. The composition of claim 1, wherein the NCO-containing component (B) consists essentially of one or more NCO-terminated polyurethane prepolymers having an NCO group content of 8 wt. % to 25 wt. %.

4. The composition claim 1, wherein the one or more polyether-ester polyols comprises repeat units derived from at least one of:
    one or more polycarboxylic acids,
    one or more $C_2$-$C_{15}$ monomeric polyols, or
    one or more polyols containing ether groups with a number average molecular weight (Mn) of 200 Da to 4000 Da.

5. The composition of claim 4, wherein the one or more polycarboxylic acids are selected from the group consisting of $C_1$-$C_{15}$ aliphatic dicarboxylic acids, $C_6$-$C_{20}$ aromatic dicarboxylic acids, 2,6-naphthalenedicarboxylic acid, and any mixture thereof.

6. The composition of claim 4, wherein the one or more polycarboxylic acids are selected from the group consisting of malonic acid, succinic acid, glutaric acid, adipic acid, pimelic acid, suberic acid, sebacic acid, dodecanedioic acid, azelaic acid, phthalic acid, isophthalic acid, terephthalic acid, diphenic acid, 2,6-naphthalenedicarboxylic acid, and any mixture thereof.

7. The composition of claim 4, wherein the one or more $C_2$-$C_{15}$ monomeric polyols are selected from the group consisting of ethylene glycol, diethylene glycol, triethylene glycol, propylene glycol, dipropylene glycol, tripropylene glycol, butylene glycol, dibutylene glycol, tributylene glycol, pentylene glycol, dipentylene glycol, tripentylene glycol, glycerin, trimethylolpropane, 2-methylpropylene glycol, and any mixture thereof.

8. The composition of claim 4, wherein the one or more polyols containing ether groups are selected from the group consisting of polyethylene glycol, polypropylene glycol, polybutylene glycol, polypentylene glycol, polyhexylene glycol, poly(ethylene oxide-co-propylene oxide) glycol, poly(ethylene oxide-co-butylene oxide) glycol, poly(ethylene oxide-co-pentylene oxide) glycol, poly(ethylene oxide-co-hexylene oxide) glycol, poly(propylene oxide-co-butylene oxide) glycol, poly(propylene oxide-co-pentylene oxide) glycol, poly(propylene oxide-co-hexylene oxide) glycol, poly(butylene oxide-co-pentylene oxide) glycol, poly(butylene oxide-co-hexylene oxide) glycol, and poly(pentylene oxide-co-hexylene oxide) glycol, and any mixture thereof.

9. The composition of claim 4, wherein the one or more polyether-ester polyols have a viscosity in the range of 500 mPa·s to 10000 mPa·s at 25° C.

10. The composition of claim 1, wherein the OH-containing component (A) has a viscosity in the range of 500 mPa·s to 10000 mPa·s at 25° C.

11. The composition of claim 1, wherein the mass ratio between the OH-containing component (A) and the NCO-containing component (B) is in the range of 1:1 to 1:2.

12. The composition of claim 1, wherein the molar ratio between the OH group in the OH-containing component (A) and the NCO group in the NCO-containing component (B) is in the range of 1:1.2 to 1:2.

13. The composition of claim 1, wherein the NCO-containing component (B) comprises at least 95 wt. % of one or more NCO-terminated polyurethane prepolymers based on the total weight of the NCO-containing component (B).

14. A cured reaction product comprising the two-component, solvent free polyurethane adhesive composition of claim 1.

15. An article comprising the cured reaction product of claim 14.

16. A method of bonding two flexible substrates, the method comprising:
mixing an OH-containing component (A) and a NCO-containing component (B) to form a mixed adhesive composition, wherein:
the mass ratio between the OH-containing component (A) and the NCO-containing component (B) is greater than 1:1,
the molar ratio between the OH group in the OH-containing component (A) and the NCO group in the NCO-containing component (B) is less than 1:1, and
the OH-containing component (A) comprises at least 90 wt. % of one or more polyether-ester polyols having a hydroxyl value of 70 to 150 mg KOH/g;
applying the mixed adhesive composition to at least a first substrate; and
laminating the first substrate with the applied mixed adhesive composition to a second substrate.

17. The composition of claim 1, wherein the OH-containing component (A) comprises 100 wt. % of one or more polyether-ester polyols having a hydroxyl value of 70 to 150 mg KOH/g.

18. The composition of claim 4, wherein:
(i) the one or more polycarboxylic acids are selected from the group consisting of adipic acid, isophthalic acid, and a combination thereof,
(ii) the one or more $C_2$-$C_{15}$ monomeric polyols are selected from the group consisting of diethylene glycol, glycerl, and a combination thereof, and
(iii) the one or more polyols containing ether groups are selected from the group consisting of polypropylene glycol, poly(ethylene coxide-copropylene oxide) glycol, and a combination thereof.

19. The composition of claim 1, wherein the molar ratio between the OH group in the OH-containing component (A) and the NCO group in the NCO-containing component (B) is about 1:1.5.

* * * * *